United States Patent Office 3,527,790
Patented Sept. 8, 1970

3,527,790
CONTINUOUS PROCESS FOR THE PRODUCTION OF ESTERS OF ISOPROPANOL
Jean Moundlic, Paris, and Georges Gobron, Melle, Deux-Sevres, France, assignors, by mesne assignments, to Melle-Bezons, Melle, Deux-Sevres, France, a corporation of France
No Drawing. Filed May 29, 1967, Ser. No. 642,222
Claims priority, application France, June 30, 1966, 67,699; Mar. 17, 1967, 99,264
Int. Cl. C07c 67/00, 29/06
U.S. Cl. 260—488　　　　　　　　　　　　13 Claims

ABSTRACT OF THE DISCLOSURE

This disclosure describes a continuous process for the preparation of esters of isopropanol and an aliphatic, monocarboxylic acid containing from two to four carbon atoms by directing the reaction product of propylene and aqueous sulfuric acid into a distillation column containing said aliphatic acid and water vapor at a preferred temperature of from 75° C. to 140° C. and a pressure of from atmospheric to 5 kg./cm.$^2$, effective.

---

This invention is concerned with a novel and facile process for the preparation of organic esters of isopropanol in which the organic acid moiety contains from two to four carbon atoms. More particularly, it is concerned with a continuous process for the preparation of such esters by directing the reaction product of propylene and aqueous sulfuric acid together with the appropriate organic acid into a distillation column containing water vapor at an elevated temperature at a pressure of from about atmospheric to about 5 kg./cm.$^2$, effective.

The invention therefore relates to the preparation of isopropyl acetate, isopropyl propionate, isopropyl n-butyrate, and isopropyl isobutyrate. For convenience, the invention will be principally described as utilized in the preparation of isopropyl acetate, bearing in mind however that the description is merely illustrative of the scope of the invention. The process conditions employed in the preparation of this ester are similarly applicable to other esters of the defined class.

In the conventional process for the preparation of isopropanol by the liquid phase hydration of propylene under pressure utilizing aqueous sulfuric acid, generally of a strength between 50% and 85% by weight, a mixture of water, sulfuric acid and isopropyl esters (mostly isopropyl hydrogen sulfate and some di-isopropyl sulfate) is obtained. The mixture also usually contains small amounts of propylene polymers, di-isopropyl ether and free isopropanol. For convenience, hereinafter the isopropanol and isopropyl sulfate ester content will be referred to as the combined propylene content.

The usual method for obtaining the isopropanol from such a mixture is to direct the mixture into a distillation column containing water vapor at a temperature of from about 80° C. to about 150° C. to effect hydrolysis of the isopropyl sulfate esters contained therein. The isopropanol is distilled off through the top of the column and recovered by condensation.

It has now been found in accordance with this invention that the above mixture consisting of the reaction product of propylene with aqueous sulfuric acid containing isopropanol and isopropyl sulfate can be converted to the ester of isopropanol and a saturated aliphatic monocarboxylic acid by heating the mixture in the presence of water vapor and the selected acid so as to perform simultaneously the hydrolysis of the inorganic esters and the formation of the organic esters by acylation of isopropanol. Thus, for example, isopropyl acetate is prepared by directing acetic acid and the mixture comprising isopropanol and isopropyl sulfate which results from the reaction of propylene with aqueous sulfuric acid into a distillation column containing water vapor, at an elevated temperature and a pressure which may be from atmospheric to about 5 kg./cm.$^2$, effective. The isopropyl ester produced may contain an amount of free isopropanol which varies inversely with the amount of organic acid employed. If the amount of acid is at least one mole per mole of combined propylene in the original mixture, the isopropyl ester will be substantially free of isopropanol. As the amount of acid employed in the distillation column decreases the amount of isopropanol increases. Thus, the isopropanol content of the product varies inversely with the amount of acid employed.

It has been noted in carrying out the process of the invention that relatively small amounts of diisopropyl ether is formed. This ether formation appears to be unavoidable. Most of it is apparently formed during the absorption stage of the propylene in the aqueous sulfuric acid.

As indicated above, the relative proportion of isopropanol and isopropyl ester in the reaction product can be varied at will by varying the amount of organic acid employed. The reaction mixture may contain isopropyl ester and isopropanol in relative proportions by weight of from 100:1 or even more to 1:100 or even less. It has been found in actual practice that it is most economical to carry out the invention so as to obtain a conversion rate of propylene (with respect to that initially fixed in forms other than as diisopropyl ether) to esters of from about 80 to 95% and to isopropanol of from about 20 to 5%. The reason for this is that a high conversion rate requires the use of at least one mole of organic acid per mole of combined propylene with the result that relatively large quantities of this acid are retained in the diluted aqueous sulfuric acid solution which remains after recovery, by distillation, of the products obtained. It is not possible to recover the organic acid from this mixture in any practical manner.

The invention is most advantageously operated as a continuous process by directing the raw absorption mixture obtained from propylene and aqueous sulfuric acid (50 to 85% by weight) together with the selected quantity of monocarboxylic acid into a heated distillation column under conditions of temperature and pressure to provide water vapor and to effect the desired reaction while continuously separating the reaction products from the residual aqueous sulfuric acid.

The preferred temperature for carrying out the desired reaction is from about 75° C. to about 140° C. since this is the most economical range although temperatures appreciably outside of this range can be usefully employed. In continuous operations, the portion of the distillation column between the feed point and the base of the column is preferably maintained at a temperature in the above range.

The operating pressure may vary from about atmospheric to about 5 kg./cm.$^2$, effective. The preferred pressure for most efficient ester production is from atmospheric to 3 kg./cm.$^2$, effective.

The reaction is carried out while maintaining the temperature and pressure variables in the above ranges so that a vaporous mixture containing the desired reaction products exits from the top of the distillation column. Conditions are preferably selected so that the vaporous mixture is substantially free of any uncombined organic acid such as acetic acid. In any event, the mixture containing isopropyl ester, isopropanol and diisopropyl ether is condensed. The desired products are most conveniently separated from the condensate by distillation.

The process of the invention, as will be clear from the foregoing, is very versatile and economic. It permits the production in high yield of reaction products containing varying proportions of isopropanol and its organic esters.

Typically, in the examples given below the reaction is carried out in a glass column measuring 2.4 meters in height by 40 millimeters in diameter which is filled with a packing of 5 millimeter Raschig rings. The column is continuously fed at a constant rate, at 50 centimeters below its top, with a mixture of organic acid and a raw reaction product of propylene with aqueous sulfuric acid as described above. A flask at the bottom of the column is heated to act as a reboiler to supply the column with water vapor. During the operation of the process, the flask is continuously fed with water so as to maintain the aqueous sulfuric acid which collects in the flask at a preferred concentration of from about 30% to 50% by weight. This concentration is preferred to limit decomposition of the traces of organic products present giving rise to regeneration of propylene, and to inhibit reactions of decomposition of propylene polymers giving rise to free carbon formation. The flask is also arranged to permit continuous withdrawal of the aqueous sulfuric acid so that the volume does not increase unnecessarily. A condenser of the conventional type is affixed to the top of the distillation column to permit condensation of the vapors issuing from the column. As usual in distallation processes, a portion of the condensed distillate is withdrawn from the apparatus and the remainder is refluxed to the top of the column.

As indicated above, it is preferred to select operating conditions so that the reflux ratio is one at which substantially all of the acid returns to the distillation-reaction column. A suitable reflux ratio can be readily determined to permit operations within the above described temperature and pressure ranges, bearing in mind the composition of the mixture being distilled, and the amount of heat supplied to the column to maintain the reaction zone at the desired temperature and ensure distillation of the products formed.

The following non-limiting examples are given by way of illustration only.

EXAMPLE 1

One starts from a raw mixture resulting from absorption of 192 grams/hour of propylene in 499 g./hr. of aqueous sulfuric acid containing 75% by weight of sulfuric acid. The reaction column described above is continuously fed with this mixture (691 g./hr.) previously mixed with 41 g./hr. of acetic acid.

The heating of the reboiler of the column is controlled to maintain a constant temperature of 94° C. at the level situated 70 cm. below the feed point of the column. The reflux to the top of the column amounts to 125 g./hr. and the amount of water fed to the base is so controlled that the aqueous sulfuric acid issuing from the reboiler has a strength of 47% by weight of acid.

The running equilibrium being reached, there is withdrawn under these conditions, from the condenser of the column 331 g./hr. of a liquid mixture containing, by weight, 21% of isopropyl acetate, 65.6% of isopropanol, 5.15% of diisopropyl ether and 0.018% of acetic acid, the remainder being water. There is withdrawn from the reboiler 796 g./hr. of an aqueous solution containing, by weight, 47% of sulfuric acid, 0.02% of acetic acid, and traces of propylene polymers.

The conversion rate into isopropyl acetate, with respect to the initially-absorbed propylene, is 15%. The acetic acid conversion into ester is above 99.7%.

EXAMPLE 2

One starts from a raw mixture resulting from absorption of 189 g./hr. of propylene in 492 g./hr. of aqueous sulfuric acid containing 75% by weight of sulfuric acid. The reaction column described above is continuously fed with this mixture (681 g./hr.) previously mixed with 76 g./hr. of acetic acid.

The operating conditions being the same as in Example 1, there is withdrawn from the condenser of the column 386.5 g./hr. of a liquid mixture containing, by weight, 33.4% of isopropyl acetate, 53.2% of isopropanol, 4.83% of diisopropyl ether and 0.015% of acetic acid, the remainder being water. There is withdrawn from the reboiler 785 g./hr. of an aqueous solution containing, by weight, 47% of sulfuric acid, 0.02% of acetic acid, and traces of propylene polymers.

The conversion rate into isopropyl acetate, with respect to the initially-absorbed propylene, is 28%. The acetic acid conversion into ester is above 99.9%.

EXAMPLE 3

One starts from a raw mixture resulting from absorption of 195 g./hr. of propylene in 507 g./hr. of aqueous sulfuric acid containing 75% by weight of sulfuric acid. The reaction column described above is continuously fed with this mixture (702 g./hr.) previously mixed with 167 g./hr. of acetic acid.

The operating conditions being the same as in Example 1, there is withdrawn from the condenser of the column 419.5 g./hr. of a liquid mixture containing, by weight, 67.5% of isopropyl acetate, 22.1% of isopropanol, 3.8% of diisopropyl ether, and 0.018% of acetic acid, the remainder being water. There is withdrawn from the reboiler 809 g./hr. of an aqueous solution containing, by weight, 47% of sulfuric acid, 0.05% of acetic acid, and traces of propylene polymers.

The conversion rate into isopropyl acetate, with respect to the initially-absorbed propylene, is 60%. The acetic acid conversion into ester is 99.7%.

EXAMPLE 4

One starts from a raw mixture resulting from absorption of 191.5 g./hr. of propylene in 497.5 g./hr. of aqueous sulfuric acid containing 75% by weight of sulfuric acid. The reaction column described above is continuously fed with this mixture (689 g./hr.) previously mixed with 247 g./hr. of acetic acid.

The operating conditions being the same as in Example 1, there is withdrawn from the condenser of the column 463 g./hr. of a liquid mixture containing, by weight, 85.9% of isopropyl acetate, 7.45% of isopropanol, 3.77% of diisopropyl ether, and 0.05% of acetic acid, the remainder being water. There is withdrawn from the reboiler 794 g./hr. of an aqueous solution containing, by weight, 47% of sulfuric acid, 1.55% of acetic acid (this representing a loss of 0.52 mole of acetic acid per 9.45 moles of isopropyl acetate produced), and traces of propylene polymers.

The conversion rate into isopropyl acetate, with respect to the initially-absorbed propylene, is 85.5% and, with respect to the propylene initially fixed in forms other than that of diisopropyl ether, 94%. Only 7.2% of the absorbed propylene was initially fixed in the form of diisopropyl ether. The acetic acid conversion into ester is 94.7%.

EXAMPLE 5

One starts from a raw mixture resulting from absorption of 69.93 g./hr. of propylene in 171.07 g./hr. of aqueous sulfuric acid containing 75% by weight of sulfuric acid. The reaction column described above is continuously fed with this mixture (241 g./hr.) previously mixed with 59 g./hr. of n-butyric acid.

The heating of the reboiler of the column is controlled to maintain a constant temperature of 104° C. at the level situated 70 cm. below the feed point of the column. There is refluxed to the top of the column the whole lower layer (aqueous layer) and 200 g./hr. of the upper layer (organic layer) formed by decantation of the condensate of the head vapors. The amount of water fed to the base of the column is so controlled that the aqueous sulfuric acid issuing from the reboiler has a strength of about 40% by weight of acid.

The running equilibrium being reached, there is withdrawn from the condenser of the column 159 g./hr. of a liquid mixture containing, by weight, 51.6% of isopropyl n-butyrate, 35.2% of isopropanol, 3.75% of diisopropyl ether, 0.20% of n-butyric acid and 9.25% of water. There is withdrawn from the reboiler 310 g./hr. of an aqueous solution containing, by weight, 41.3% of sulfuric acid, 1% of n-butyric acid, and traces of propylene polymers.

The conversion rate into isopropyl n-butyrate, with respect to the initially-absorbed propylene, is 38%. The n-butyric acid conversion into ester is 96%.

EXAMPLE 6

The starting propylene absorption mixture is the same as that in Example 4. The reaction column described above is continuously fed with this mixture (689 g./hr.) previously mixed with 342 g./hr. of acetic acid.

The operating conditions being the same as in Example 1, there is withdrawn from the condenser of the column 456 g./hr. of a liquid mixture containing 430 g. of isopropyl acetate, 17.4 g. of diisopropyl ether, 0.6 g. of acetic acid and 8 g. of water. There is withdrawn from the reboiler a sulfuric acid aqueous solution containing 89 g./hr. of acetic acid.

Thus, no isopropanol is formed but the acetic acid loss is high.

EXAMPLE 7

The starting propylene absorption mixture is the same as that in Example 5. The reaction column is similar to that described above but is made of steel with a lead lining. This column, maintained at a pressure of 3.5 kg./cm.$^2$, effective, is continuously fed with the starting mixture (241 g./hr.) previously mixed with 65 g./hr. of isobutyric acid.

The heating of the reboiler of the column is controlled to maintain a constant temperature of 140° C. at the level situated 70 cm. below the feed point of the column. There is refluxed to the top of the column the whole lower layer and 200 g./hr. of the upper layer formed by decantation of the condensate of the head vapors. The amount of water fed to the base of the column is so controlled that the aqueous sulfuric acid issuing from the reboiler has a strength of about 30% by weight of acid.

The running equilibrium being reached, there is withdrawn from the condenser of the column 158 g./hr. of a liquid mixture containing 93.3 g. of isopropyl isobutyrate, 49.8 g. of isopropanol, 5.95 g. of diisopropyl ether, 0.3 g. of isobutyric acid and 8.65 g. of water. There is withdrawn from the reboiler 430 g./hr. of an aqueous solution containing, by weight, about 30% of sulfuric acid, 0.45% of isobutyric acid, and traces of propylene polymers.

The conversion rate into isopropyl isobutyrate, with respect to the initially-absorbed propylene, is 43.1%. The isobutyric acid conversion into ester is 97.2%.

We claim:

1. A continuous one-step process for the treatment of the mixture comprising isopropanol and isopropyl sulfate which results from the reaction of propylene with aqueous sulfuric acid which comprises continuously feeding said mixture into a distillation column containing water vapor together with an alkanoic acid containing from two to four carbon atoms at a pressure of from about atmospheric to about 5 kg./cm.$^2$, effective, and a temperature of from about 75° C. to about 140° C. thereby producing the ester of isopropanol and the alkanoic acid.

2. A process as in claim 1, in which at least one mole of acid per mole of isopropanol and isopropyl sulfate in said mixture is employed and the resulting ester is substantially free from isopropanol.

3. A process as in claim 1, in which less than one mole of acid per mole of isopropanol and isopropyl sulfate in said mixture is employed and the resulting ester contains an amount of isopropanol which varies inversely with the amount of acid employed.

4. A process as in claim 1, in which the acid is acetic acid.

5. A process as in claim 2, in which the acid is acetic acid.

6. A process as in claim 3, in which the acid is acetic acid.

7. A process as in claim 1, in which the acid contains three or four carbon atoms.

8. A process as in claim 2, in which the acid contains three or four carbon atoms.

9. A process as in claim 3, in which the acid contains three or four carbon atoms.

10. A process as in claim 1, in which the isopropyl ester containing vaporous mixture issuing from the top of the distillation column is condensed, a portion of the condensate is refluxed and the remainder of the condensate is collected and distilled to recover the isopropyl ester.

11. A process as in claim 10, wherein the reflux and the temperature and pressure in the distillation column are maintained at ranges such that the vaporous mixture is substantially free of organic acid.

12. A process as in claim 11, in which the ester is isopropyl acetate.

13. A process as in claim 1, in which the effective pressure is from 0 to 3 kg./cm.$^2$, effective.

References Cited

UNITED STATES PATENTS 1,910,818   5/1933   Ufer _____ 260—492
1,979,516   11/1934  Wilson _____ 260—492

FOREIGN PATENTS 478,073   6/1937   Great Britain.

LORRAINE A. WEINBERGER, Primary Examiner

V. GARNER, Assistant Examiner

U.S. Cl. X.R.

260—492, 614, 641